(12) United States Patent
Yang

(10) Patent No.: US 8,162,408 B2
(45) Date of Patent: Apr. 24, 2012

(54) COMPOSITE RIM

(76) Inventor: Chih-Hsiang Yang, Taichung (TW)

( * ) Notice: Subject to any disclaimer, the term of this patent is extended or adjusted under 35 U.S.C. 154(b) by 630 days.

(21) Appl. No.: 11/938,185

(22) Filed: Nov. 9, 2007

(65) Prior Publication Data

US 2008/0174168 A1 Jul. 24, 2008

(30) Foreign Application Priority Data

Jan. 18, 2007 (TW) .............................. 96200993 U

(51) Int. Cl.
*B60B 21/00* (2006.01)
*B60B 21/08* (2006.01)

(52) U.S. Cl. .............................. 301/95.106; 301/95.102

(58) Field of Classification Search ............. 301/64.702, 301/64.703, 95.101, 95.102, 95.104, 95.106, 301/95.11
See application file for complete search history.

(56) References Cited

U.S. PATENT DOCUMENTS

| | | | | |
|---|---|---|---|---|
| 3,008,770 A * | 11/1961 | Mueller | ................. | 301/95.106 |
| 3,486,586 A * | 12/1969 | Grier, Jr. | ................. | 188/24.17 |
| 3,695,728 A * | 10/1972 | Haussels | ................. | 301/64.706 |
| 4,930,844 A * | 6/1990 | Giroux | ................. | 301/64.704 |
| 5,080,444 A * | 1/1992 | Hopkins et al. | ................. | 301/95.107 |
| 5,104,199 A * | 4/1992 | Schlanger | ................. | 301/64.704 |
| 5,246,275 A * | 9/1993 | Arredondo, Jr. | ................. | 301/64.705 |
| 5,415,463 A * | 5/1995 | Olson et al. | ................. | 301/64.702 |
| 5,490,719 A * | 2/1996 | Lew | ................. | 301/5.1 |
| 5,540,485 A * | 7/1996 | Enders | ................. | 301/104 |
| 5,564,793 A * | 10/1996 | Whiteford | ................. | 301/64.703 |
| 5,782,540 A * | 7/1998 | Camfield et al. | ................. | 301/64.202 |
| 5,975,645 A * | 11/1999 | Sargent | ................. | 301/95.11 |
| 6,991,298 B2 * | 1/2006 | Ording et al. | ................. | 301/30 |
| 2008/0315676 A1 * | 12/2008 | Cobb | ................. | 301/95.102 |

* cited by examiner

*Primary Examiner* — S. Joseph Morano
*Assistant Examiner* — Kip T Kotter

(57) ABSTRACT

A composite rim includes a tire-receiving ring made of metal and a spoke-connecting ring made of plastic. The tire-receiving ring includes at least one dovetail formed on the bottom thereof and two sidewalls formed thereon. The spoke-connecting ring includes two brake-contacting members located tightly outside the sidewalls of the tire-receiving ring, a cross member formed between the brake-contacting members and at least one dovetail groove defined in the cross member for receiving the dovetail.

4 Claims, 5 Drawing Sheets

COMPOSITE RIM

BACKGROUND OF INVENTION

1. Field of Invention

The present invention relates to a rim for a bicycle and, more particularly, to a composite rim.

2. Related Prior Art

Traditional rims for bicycles are made such as alloy. A metal rim is made of a metal strip. The metal strip is made into a circular shape by rolling. Two ends of the metal strip are joined together by soldering. Such a metal rim, however, is heavy. Furthermore, the process for making such a metal rim is complicated. Moreover, the point of soldering becomes a weak point from which fracture could easily occur. The life of such a metal is therefore reduced. In addition, with inherent ductility, such a metal rim could easily be deformed in a violent bump. Such deformation could jeopardize the safety of a rider.

A composite rim is found in U.S. Pat. No. 6,991,298 for example. The composite rim includes a body 12 made of fiber-reinforced plastic and a tire-receiving ring 14 made of metal. The body 12 is surrounded by the tire-receiving ring 14. The body 12 includes sidewalls 20 and 22 and a cross member 30 formed between the sidewalls 20 and 22. The body 12 is formed with a crown that includes crown sidewalls 37 and 39. The tire-receiving ring 14 includes braking members 51 and 53 and a base member 50 formed between the braking members 51 and 53. The crown sidewalls 37 and 39 of the body 12 is clamped by the braking members 51 and 53 of the tire-receiving ring 14. Beads 58 and 60 are formed on internal faces of the braking members 51 and 53. The beads 58 and 60 can be engaged with two compliant beads of a tire. External faces of the braking members 51 and 53 are used as braking faces 52 and 54 for contact with brake shoes. The braking faces 52 and 54 are however too smooth to cause sufficient friction against the brake shoes.

The present invention is therefore intended to obviate or at least alleviate the problems encountered in prior art.

SUMMARY OF INVENTION

The primary objective of the present invention is to provide a composite rim that can provide sufficient friction between brake shoes.

According to the present invention, a composite rim includes a tire-receiving ring made of metal and a spoke-connecting ring made of plastic. The tire-receiving ring includes at least one dovetail formed on the bottom thereof and two sidewalls formed thereon. The spoke-connecting ring includes two brake-contacting members located tightly outside the sidewalls of the tire-receiving ring, a cross member formed between the brake-contacting members and at least one dovetail groove defined in the cross member for receiving the dovetail.

Other objectives, advantages and features of the present invention will become apparent from the following description referring to the attached drawings.

BRIEF DESCRIPTION OF DRAWINGS

The present invention will be described via detailed illustration of the preferred embodiment referring to the drawings.

DETAILED DESCRIPTION OF PREFERRED EMBODIMENT

Figure 1:
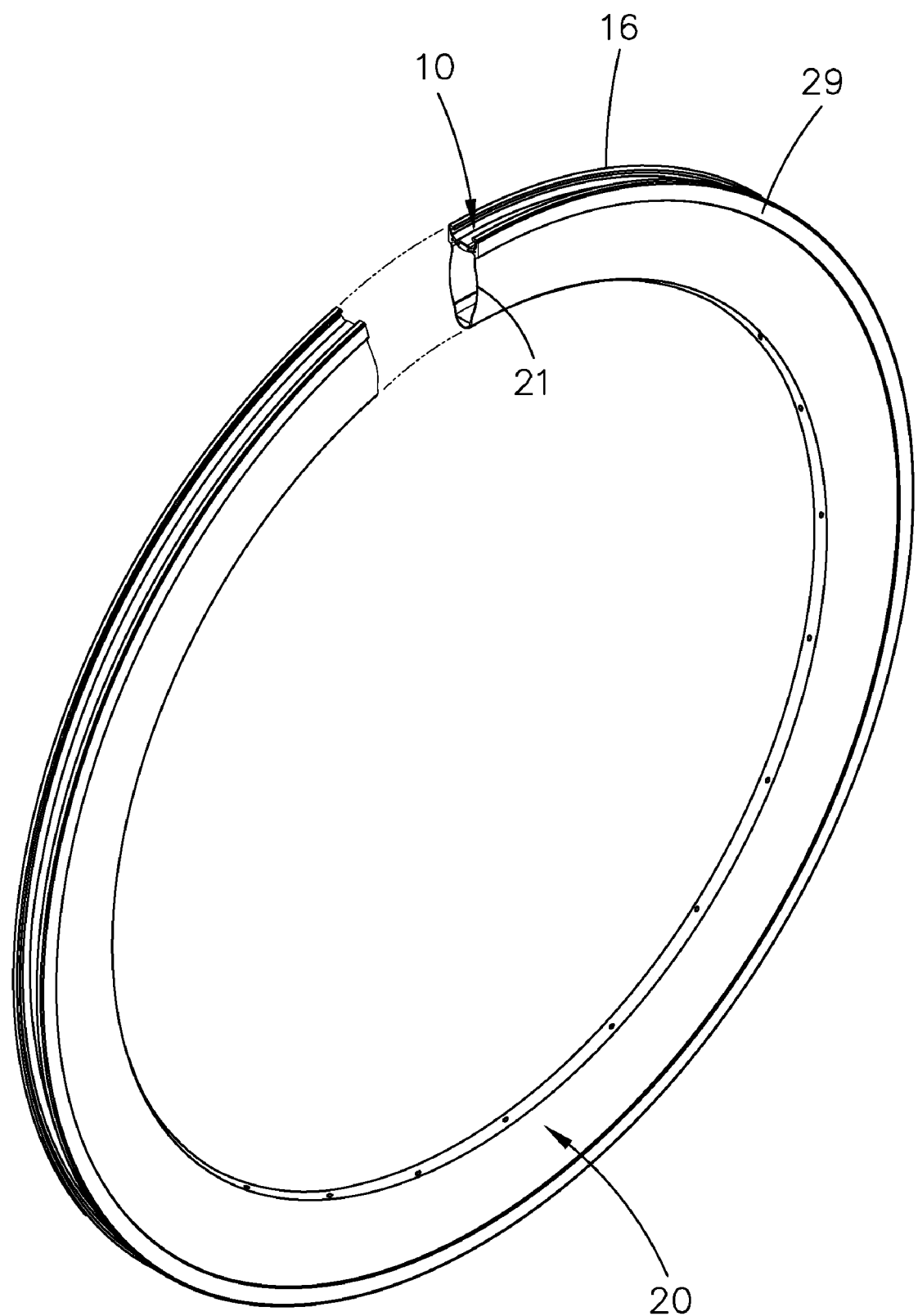
FIG. 1 is a perspective view of a composite rim according to the preferred embodiment of the present invention.

Referring to FIG. 1, according to the preferred embodiment of the present invention, a composite rim includes a tire-receiving ring 10 and a spoke-connecting ring 20 joined to the tire-receiving ring 10. The tire-receiving ring 10 is made of metal such as alloy for high strength. The spoke-connecting ring 20 is made of plastic such as carbon fiber-reinforced plastic for light weight.

Figure 2:
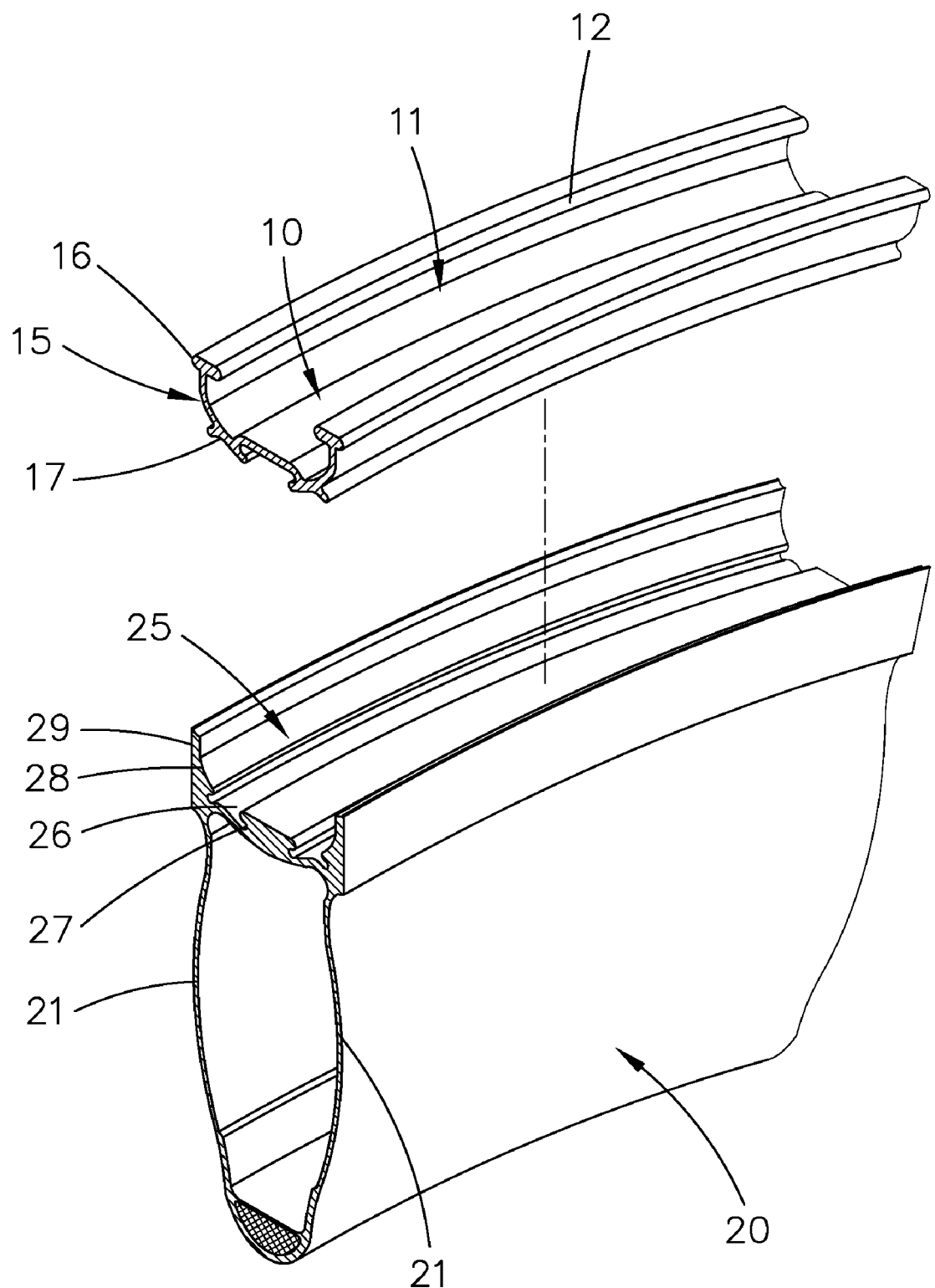
FIG. 2 is a partial exploded view of the rim shown in FIG. 1.
Figure 3:
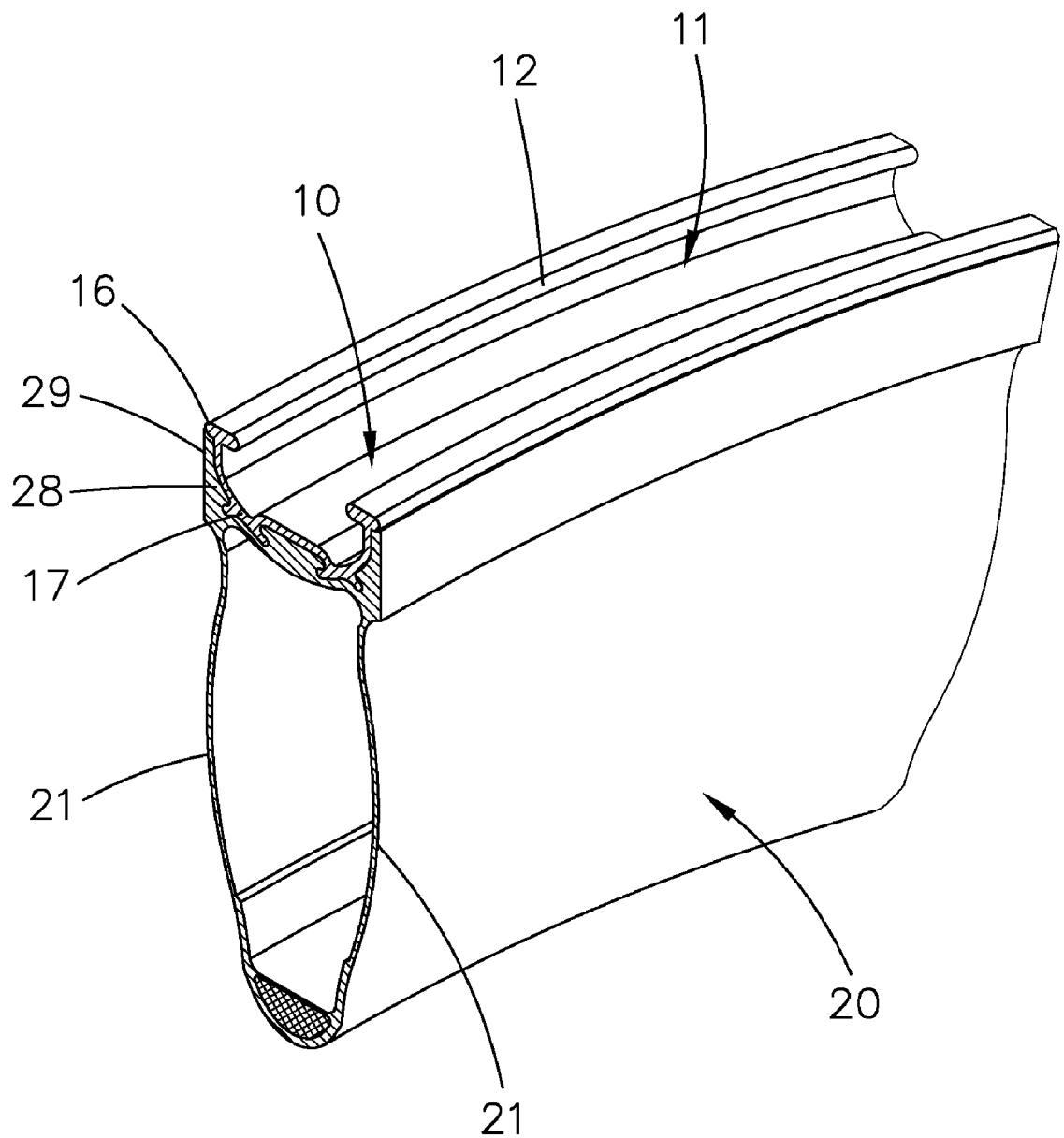
FIG. 3 is a partial perspective view of the rim shown in FIG. 1.
Figure 4:
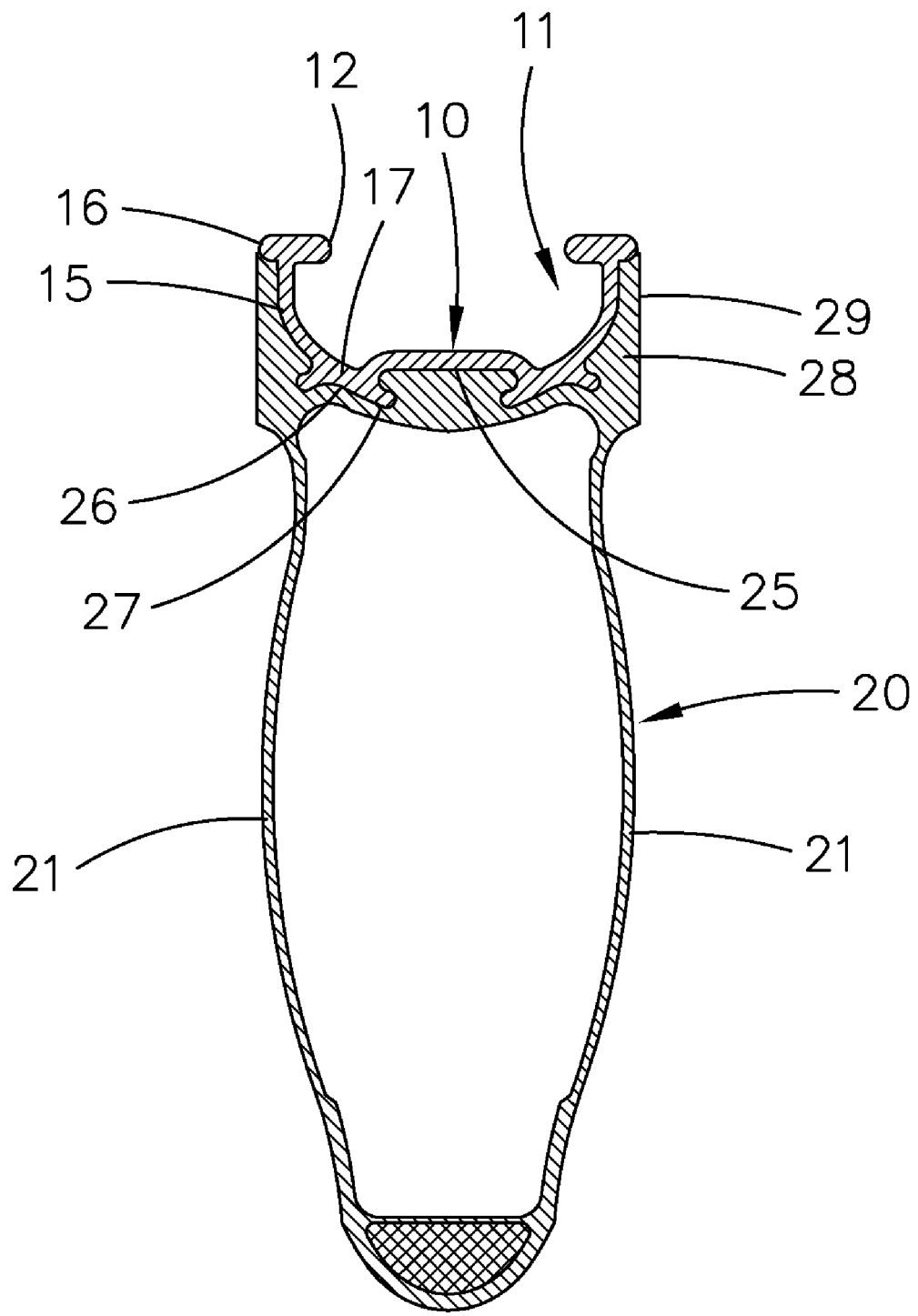
FIG. 4 is a cross-sectional view of the rim shown in FIG. 1.

Referring to FIG. 2, the tire-receiving ring 10 has a substantial U-shaped cross section as shown in FIGS. 3 and 4. The tire-receiving ring 10 includes a base, two sidewalls 15 annularly formed on the base and a space 11 defined between the sidewalls 15. An internal flange 12 is annularly formed on each of the sidewalls 15 and axially extends inwards. An external flange 16 is annularly formed on each sidewall 15 and axially extends outwards.

Two dovetails 17 are annularly formed on the bottom of the base. The tire-receiving ring 10 is made of a metal strip. The metal strip is made into a circular element by rolling. Two ends of the metal strip are joined together by soldering for example.

Figure 5:
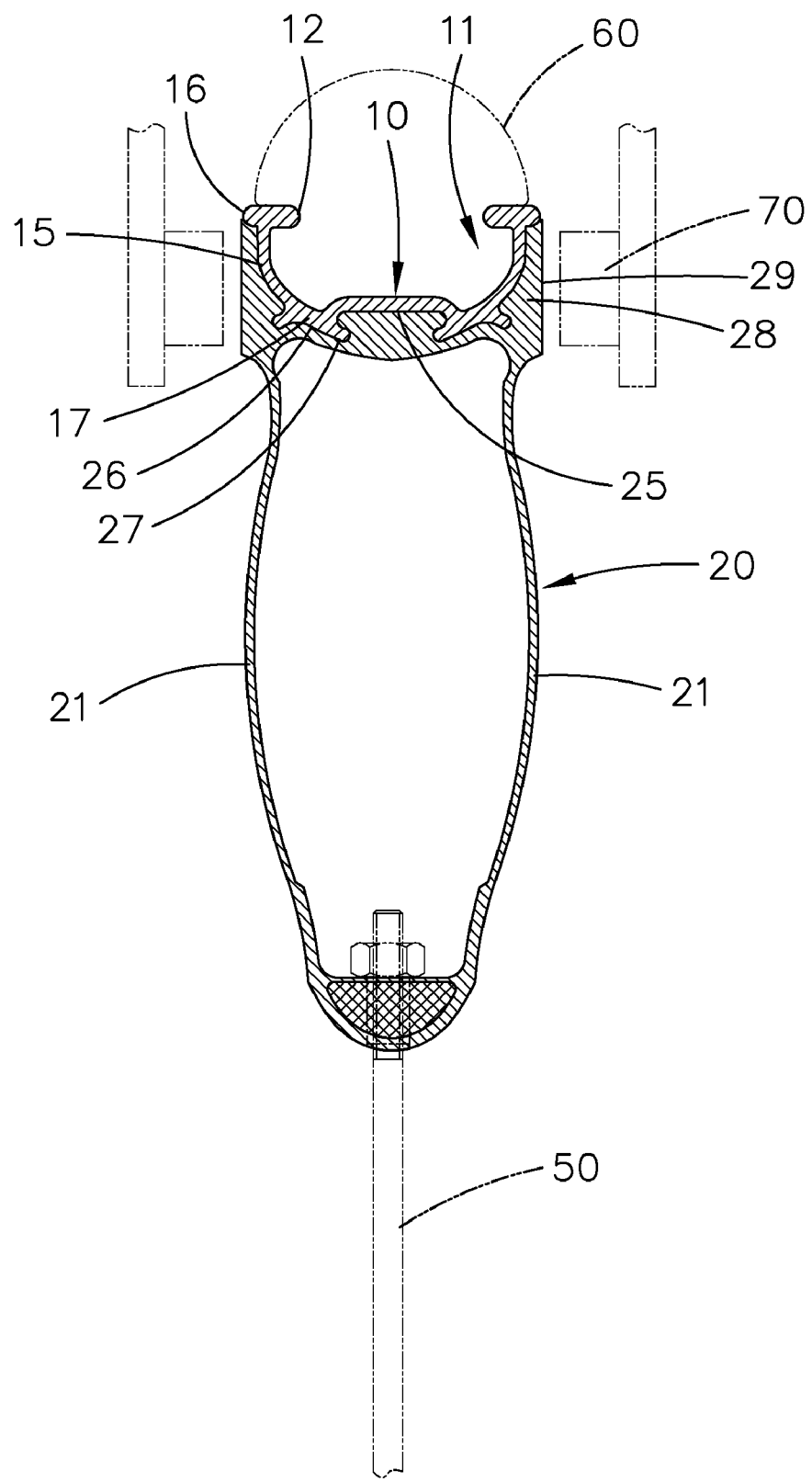
FIG. 5 is a cross-sectional view of a tire and spokes connected to the rim shown in FIG. 1.

The spoke-connecting ring 20 includes a base, two sidewalls 21 annularly formed on the base, a space 25 defined between the sidewalls 21, a cross member 27 annularly formed between the sidewalls 21, and two dovetail grooves 26 defined in the cross member 27. Two brake-contacting members 28 are respectively formed on the two sidewalls 21 and vertically extend from the two sidewalls 21 for being selectively pressed against by two brake shoes 70 (FIG. 5). The two dovetail grooves 26 respectively and correspondingly receive the two dovetails 17 of the tire-receiving ring 10. The sidewalls 21 are bulbous for providing sufficient strength. An external face of each of the brake-contacting members 28 is used as a brake-contacting surface 29. A maximum distance between the two bulbous sidewalls 21 is less than a distance between the two brake-contacting faces 29. The spoke-connecting ring 20 is formed against the tire-receiving ring 10 by molding for example.

Referring to FIGS. 3 and 4, the tire-receiving ring 10 is substantially disposed in the space 25 of the spoke-connecting ring 20. The sidewalls of the tire-receiving ring 10 are securely clamped by the brake-contacting members 28 of the spoke-connecting ring 20. The two external flanges 16 are respectively located on and radially abut against the two brake-contacting members 28. The dovetails 17 are respectively and engagedly received in the dovetail grooves 26, wherein the two brake-contacting members 28 of the spoke-connecting ring 20 are respectively, axially and outwardly located adjacent to the two sidewalls 15 of the tire-receiving ring 10 to provide a reinforcing effect.

Referring to FIG. 5, spokes 50 are connected to the base of the spoke-connecting ring 20. Two flanges of a tire 60 are engaged with the internal flanges 12 of the tire-receiving ring 10. The two brake shoes 70 are respectively located near the two brake-contacting members 28. The brake shoes 70 can be brought into contact with the brake-contacting faces 29 of the brake-contacting members 28 of the spoke-connecting ring 20 for clamping the brake-contacting faces 29 and stopping a rotation of the tire 60. As being supported by the sidewalls 15 of the tire-receiving ring 10, the brake-contacting members 28 of the spoke-connecting ring 20 can stand the load provided from the brake shoes 70.

The primary advantage of the composite rim according to the present invention is to provide sufficient friction between the brake shoes 70 and the brake-contacting faces 29 of the brake-contacting members 28 of the spoke-connecting ring 20 that is made of plastic.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A composite rim comprising:
   a tire-receiving ring made of metal, the tire-receiving ring comprising at least one dovetail annularly formed on the bottom thereof and two sidewalls annularly formed thereon; and
   a spoke-connecting ring made of plastic, the spoke-connecting ring receiving the tire-receiving ring, the spoke-connecting ring having two bulbous sidewalls annularly formed thereon, the spoke-connecting ring comprising two brake-contacting members respectively formed on the two sidewalls and vertically extending from the two sidewalls for adapting to be selectively pressed against by two brake shoes, the two brake-contacting members respectively, axially and outwardly located adjacent to the two sidewalls of the tire-receiving ring, a cross member formed between the brake-contacting members and at least one dovetail groove defined in the cross member for receiving the at least one dovetail;
   wherein when the two brake-contacting members are axially pressed against by the two brake shoes, the two sidewalls of the tire-receiving ring axially and respectively support the two brake-contacting members for reinforcing the two brake-contacting members, and a sufficient friction is provided between the plastic brake-contacting members and the brake shoes.

2. The composite rim according to claim 1 wherein each of the sidewalls of the tire-receiving ring comprises an internal flange annularly formed thereon and extending axially inwards for adapting to engage with a compliant flange of a tire.

3. The composite rim according to claim 1 wherein each of the sidewalls of the tire-receiving ring comprises an external flange annularly formed thereon and extending axially outwards, each external flange correspondingly located on and radially abut against one of the brake-contacting members of the spoke-connecting ring.

4. The composite rim according to claim 1 wherein the tire-receiving ring comprises two dovetails annularly formed thereon, and the spoke-connecting ring comprises two dovetail grooves defined therein for correspondingly receiving the dovetails.

\* \* \* \* \*